(12) United States Patent
Inagaki et al.

(10) Patent No.: US 7,419,166 B2
(45) Date of Patent: Sep. 2, 2008

(54) STEERING RACK BOOT

(75) Inventors: Hidehiko Inagaki, Aichi-ken (JP);
Katsuhisa Ota, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/715,924

(22) Filed: Mar. 9, 2007

(65) Prior Publication Data

US 2007/0210535 A1    Sep. 13, 2007

(30) Foreign Application Priority Data

Mar. 9, 2006    (JP) .............................. 2006-064647

(51) Int. Cl.
*F16J 3/00*    (2006.01)
*F16J 15/52*    (2006.01)

(52) U.S. Cl. ...................... 277/636; 464/175

(58) Field of Classification Search ................. 277/636; 464/173, 175
See application file for complete search history.

(56) References Cited

U.S. PATENT DOCUMENTS

| | | | | |
|---|---|---|---|---|
| 4,278,262 A | * | 7/1981 | Mizutani et al. ............ | 277/636 |
| 4,878,389 A | * | 11/1989 | Boge ........................... | 277/636 |
| 4,923,432 A | * | 5/1990 | Porter ......................... | 464/175 |
| 5,236,394 A | * | 8/1993 | Collins et al. ............... | 464/175 |
| 5,311,912 A | * | 5/1994 | Hayward ..................... | 138/121 |
| 6,244,967 B1 | * | 6/2001 | Takabe et al. ............... | 464/175 |
| 2005/0121860 A1 | * | 6/2005 | Ota ............................. | 277/635 |

FOREIGN PATENT DOCUMENTS

| | | |
|---|---|---|
| JP | 10-238629 | 9/1998 |
| JP | 2005-147297 | 6/2005 |
| JP | 2005-315364 | 11/2005 |

* cited by examiner

*Primary Examiner*—Alison K Pickard
(74) *Attorney, Agent, or Firm*—Posz Law Group, PLC (57) ABSTRACT

A boot includes a major-diameter fastener, a first bellows, a second bellows, a minor-diameter-side bellows, and a minor-diameter fastener. The major-diameter fastener is to be fastened to a mating major-diameter member. The first bellows is disposed continuously from the major-diameter fastener. The second bellows is disposed continuously from the first bellows. The minor-diameter-side bellows is disposed continuously from the second bellows. The minor-diameter fastener is disposed continuously from the minor-diameter-side bellows, and is to be fastened to a mating minor-diameter member. The first bellows exhibits an averaged first axial rigidity. The second bellows exhibits an averaged second axial rigidity. The minor-diameter-side bellows exhibits an averaged third axial rigidity. The averaged first axial rigidity and the averaged third axial rigidity are lower than the averaged second axial rigidity.

7 Claims, 6 Drawing Sheets

STEERING RACK BOOT

BACKGROUND OF THE INVENTION

1. Field of the Invention

The present invention relates to a boot, which is installed to rack-and-pinion type steering apparatus.

2. Description of the Related Art

A steering boot covers a ball joint, which is disposed between a steering gear box and a tie rod. Specifically, one of the opposite ends of the steering boot is fastened to a steering-gear-box end, and the other one of the opposite ends of the steering boot is fastened to a tie-rod end. Moreover, the steering boot is disposed in proximity to engine. Accordingly, the ambient temperature around the steering boot is a high temperature relatively. Consequently, air, which is sealed inside the steering boot, expands to deform the steering boot.

Figure 9:
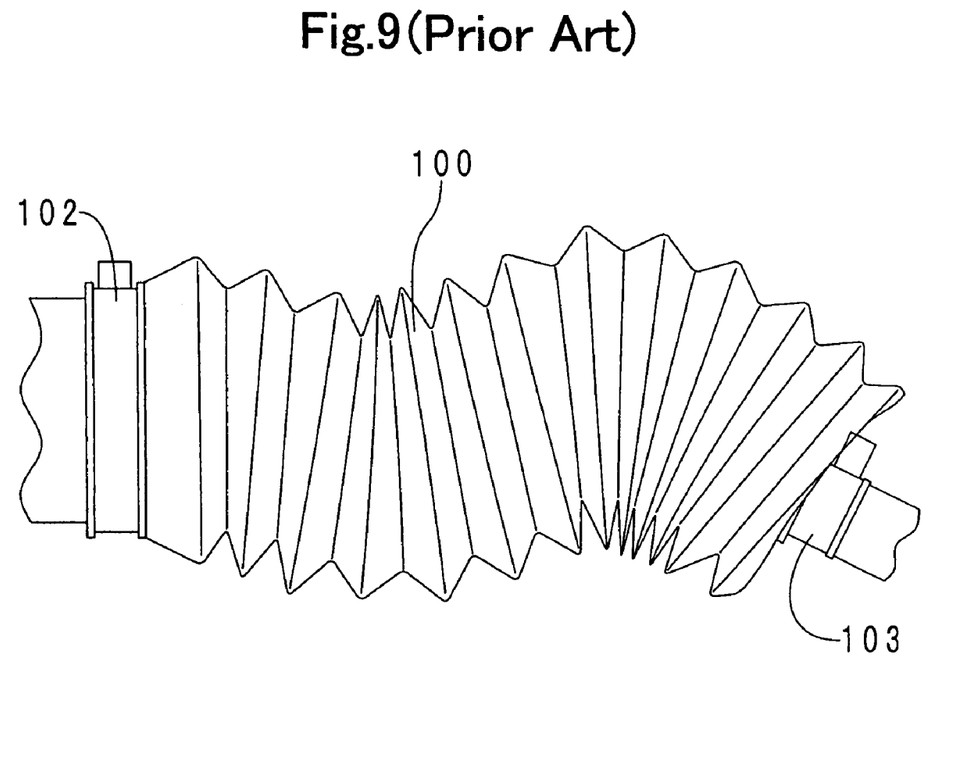
FIG. 9 is a perspective diagram for showing how a conventional steering boot is deformed.

FIG. 9 illustrates a side view of a conventional steering boot, which has deformed. As illustrated in the drawing, when the air inside a conventional steering boot 100 expands so that the conventional steering boot 100 expands and then deforms. As a result, the conventional steering boot 100 has come to undulate in a zigzag manner like a letter "S" shape. When the conventional steering boot 100 thus undulates, it might interfere with the built-in ball joint (not shown) or clamps. Accordingly, there might possibly arise such a drawback that the conventional steering boot 100 is damaged. Moreover, the conventional steering boot 100 is made of resin. Consequently, the conventional steering boot 100, which has once undergone undulating deformation, is less likely to recover the original configuration even when being cooled.

Hence, the following measure has been carried out conventionally to inhibit the undulating deformation of steering boot. For example, a steering boot is molded as a configuration whose axial length is longer than that of objective configuration. Then, the thus molded steering boot is subjected to a heat treatment to make it into the objective configuration.

Moreover, Japanese Unexamined Patent Publication (KOKAI) Gazette No. 10-238,629 discloses a conventional steering boot in which the undulating deformation is suppressed. The conventional steering boot set forth in the gazette comprises a major-diameter faster 102, and a bellows. The bellows has three roots, which are numbered starting at the one next to the major-diameter fastener 102 and which are provided with a letter "U"-shaped peripheral groove. The letter "U"-shaped peripheral grooves are dented in the three roots. Accordingly, the portion of the bellows, which is provided with the peripheral grooves, exhibits a higher radial rigidity than the other portion, which is free of the peripheral grooves, does. Consequently, the conventional steering boot set forth in the gazette is less likely to undergo the undulating deformation.

In addition, Japanese Unexamined Patent Publication (KOKAI) Gazette No. 2005-315,364 discloses a steering boot in which a portion making an outer peripheral side of ball joint is made relatively thinner than the other portions are. In this conventional steering boot, the portion making the outer peripheral side of ball joint is compressed relatively by the rising inner pressure, and the other portions are extended relatively thereby. Accordingly, in the bellows of the conventional steering boot, the bending deformation enlarges on the outer peripheral side of ball joint. Consequently, the bending deformation positions the bellows as a whole on the outer peripheral side of ball joint while contracting the bellows. As a result, the conventional steering boot hardly interferes with one of the opposite ends of ball joint.

Moreover, Japanese Unexamined Patent Publication (KOKAI) Gazette No. 2005-315,364 further proposes to make the radii of the crests and roots of the bellows smaller gradually in the direction away from the major-diameter fastener 102 to the minor-diameter fastener 103. In the thus constructed bellows, the closer to the opposite end on the side of the major-diameter fastener 102 is the larger the pressure-receiving radius becomes relatively upon the rise of inner pressure; and the closer to the opposite end on the side of the minor-diameter fastener 103 is the smaller the pressure-receiving radius becomes relatively thereupon. Accordingly, the extending force of the bellows, which is exerted by the rising inner pressure, is larger relatively on the side of the major-diameter fastener 102, and is smaller relatively on the side of the minor-diameter fastener 103. That is, the bellows extends on the side of the major-diameter fastener 102, but contracts on the side of the minor-diameter fastener 103. Consequently, the extension of the bellows on the side of the major-diameter fastener 102 inhibits the portions of the bellows, which are disposed closer to the opposite end on the side of the major-diameter fastener 102, from moving diametrically. As a result, the conventional steering boot can inhibit the interference with one of the opposite ends of ball joint furthermore.

In addition, Japanese Unexamined Patent Publication (KOKAI) Gazette No. 2005-147,297 discloses a steering boot in which the central section of the bellows has a root inside diameter, which is made identical with or smaller than that of the portions on the side of the major-diameter fastener 102; and the central section thereof exhibits a lower radial rigidity than that of the other portions. Namely, this conventional boot comprises a bellows which exhibits an enhanced diametric rigidity on the side of the major-diameter fastener 102, and at the same time an axial rigidity, which is held at the same level as that of the central section of the bellows, on the side of the major-diameter fastener 102. The conventional steering boot can be inhibited from undergoing the undulating deformation by such a relatively simple means as changing the root inside diameter of the bellows. Accordingly, the conventional steering boot needs the man-hour requirement for machining the mold less. Consequently, the conventional steering boot can be manufactured at lower cost. Moreover, the bellows is less likely to deform on the side of the major-diameter fastener 102 because the diametric rigidity is enhanced on the side of the major-diameter fastener 102 while retaining the axial rigidity thereon. As a result, the bellows is less likely to interfere with a clamp, which is disposed around the major-diameter fastener 102, on the side of the major-diameter fastener 102.

However, the conventional method for inhibiting the undulating deformation of steering boot by means of heat treatment requires post processing, such as annealing for removing the residual internal stress from the resulting steering boot. Therefore, the conventional method suffers from the drawback that the man-hour requirements are great.

In the conventional steering boot disclosed in Japanese Unexamined Patent Publication (KOKAI) Gazette No. 10-238,629, it is needed to provide the bellows with the peripheral grooves in order to enhance the rigidity. However, note that the peripheral grooves are irrelevant to the inherent function of bellows. Accordingly, the man-hour requirements for machining a mold for the conventional steering boot have increased. Consequently, the conventional steering boot has suffered from a high manufacturing cost inevitably. Moreover, when providing the bellows with the peripheral grooves, the conventional steering boot has adversely exhibited a degraded rigidity in the expansion/contraction direction of the bellows. As a result, there might arise a probability that, upon the expanding deformation, the part of the bellows, which has undergone the undulating deformation, has been likely to interfere with a clamp, which is fastened to an opposite end of steering gear box.

The conventional steering boot disclosed in Japanese Unexamined Patent Publication (KOKAI) Gazette No. 2005-315,364 has the following problem. That is, since the parts of the bellows, which make the outer peripheral side of ball joint, are thinned out, the thinned-out parts are likely to be damaged when they happen to be disposed in between ball joint and flying ballast upon colliding with flying ballast.

Moreover, in the conventional steering boot disclosed in Japanese Unexamined Patent Publication (KOKAI) Gazette No. 2005-147,297, the undulating deformation is inhibited by making the inside diameter of the bellows' roots smaller around ball joint. Accordingly, it is difficult to inhibit the sections of the bellows, which are disposed away from ball joint, from undergoing the undulating deformation. Consequently, when a ball joint is positioned off from the central section of the bellows, the sections of the bellows, which are disposed away from the ball joint, might possibly undergo the undulating deformation.

SUMMARY OF THE INVENTION

The present invention has been developed in view of the aforementioned problems. It is therefore an object of the present invention to provide a boot, which can be manufactured at low cost and which can inhibit the undulating deformation from occurring, without ever carrying out a heat treatment.

A boot according to the present invention solves the aforementioned problems, and comprises:
- a major-diameter fastener to be fastened to a mating major-diameter member;
- a first bellows disposed continuously from the major-diameter fastener;
- a second bellows disposed continuously from the first bellows;
- a minor-diameter-side bellows disposed continuously from the second bellows; and
- a minor-diameter fastener disposed continuously from the minor-diameter-side bellows, and to be fastened to a mating minor-diameter member;
- the first bellows exhibiting an averaged first axial rigidity;
- the second bellows exhibiting an averaged second axial rigidity;
- the minor-diameter-side bellows exhibiting an averaged third axial rigidity; and
- the averaged first axial rigidity and the averaged third axial rigidity being lower than the averaged second axial rigidity.

Moreover, in the present boot, the minor-diameter-side bellows can preferably have crests, and roots;
the crests can preferably comprise:
- a front membrane disposed in succession from one of the roots, which is disposed on a side of the minor-diameter fastener; and
- a rear membrane disposed in succession from one of the roots, which is disposed on a side of the major-diameter fastener;
- the front membrane exhibits a front-membrane axial rigidity;
- the rear membrane exhibits a rear-membrane axial rigidity; and
- the rear-membrane axial rigidity can preferably be higher or lower than the front-membrane axial rigidity.

In addition, in the present boot, the minor-diameter-side bellows can preferably be formed as a tapered configuration whose outside diameter tapers from large to small in the direction away from the second bellows to the minor-diameter faster.

In accordance with the present invention, the present boot comprises a bellows whose axial rigidity is designed optimally as a whole. Accordingly, the present boot can securely inhibit the undulating deformation from occurring upon the increment of inner pressure. Thus, the present boot can make the heat treatment for inhibiting the undulating deformation obsolete. Moreover, the man-hour requirements for machining a mold for the present boot are reduced. Consequently, the present boot can be manufactured at low cost.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A boot according to the present invention can be manufactured from soft resin by means of blow molding. The present boot comprises a major-diameter fastener, and a minor-diameter fastener. The major-diameter fastener and minor-diameter fastener are disposed at the opposite ends of the present boot. Moreover, the present boot further comprises a first bellows, a second bellows, and a minor-diameter-side bellows, which are provided in this order from the major-diameter fastener to the minor-diameter fastener.

The major-diameter fastener is a section, which is fastened to a mating major-diameter member. For example, when the present boot makes a steering boot, the major-diameter fastener is referred to as a section, which is fastened to one of the opposite ends of steering gear box. On the other hand, the minor-diameter fastener is a section, which is fastened to a mating minor-diameter member. For example, when the present boot makes a steering boot, the minor-diameter fastener is referred to as a section, which is fastened to one of the opposite ends of tie rod.

One of the major characteristics of the present boot lies in that the first bellows exhibits an averaged first axial rigidity; the second bellows exhibits an averaged second axial rigidity; the minor-diameter-side bellows exhibits an averaged third axial rigidity; and the averaged first axial rigidity and the averaged third axial rigidity are made lower than the averaged second axial rigidity. An "axial rigidity" of bellows herein designates a measure of the difficulty of extension/contraction deformation in the axial direction of bellows. An "averaged axial rigidity" designates an averaged value of axial rigidities, which are exhibited by a plurality of crests and roots of bellows, respectively. Note that it is preferable that the averaged first axial rigidity and the averaged third axial rigidity can be 0.3 or more, further preferably can fall in a range of from 0.4 to 0.8, with respect to the averaged second axial rigidity when the averaged second axial rigidity is taken as 1. When the averaged first axial rigidity and the averaged third axial rigidity are too low with respect to the averaged second axial rigidity, the function of bellows might be impaired. On the other hand, when the averaged first axial rigidity and the averaged third axial rigidity are too high with respect to the averaged second axial rigidity, the first bellows and minor-diameter-side bellows might produce the desirable advantages less.

When a boot undergoes the undulating deformation, it exhibits the largest deformation magnitude around the central section of the entire bellows. Hence, in the present boot, the averaged second axial rigidity of the second bellows, which is disposed between the first bellows and the minor-diameter-side bellows, is made higher than the averaged first axial rigidity of the first bellows and the averaged third axial rigidity of the minor-diameter-side bellows. Therefore, even when the inner pressure enlarges, the second bellows, which is disposed around the central section of the present boot, is inhibited from deforming in the peripheral direction. As a result, the present boot is less likely to undergo the undulating deformation.

On the other hand, the averaged first axial rigidity of the first bellows and the averaged third axial rigidity of the minor-diameter-side bellows are made lower than the averaged second axial rigidity of the second bellows. Since the first bellows exhibits the averaged first rigidity, which is made lower than the averaged second rigidity of the second bellows, the first bellows deforms to extend and/or contract in the axial direction with ease to absorb stress when the inner pressure rises. Additionally, since the opposite ends of the first bellows are disposed in succession to the major-diameter fastener, which is fastened to a mating major-diameter member, and in succession to the second bellows, whose averaged axial rigidity is higher than that of the first bellows, respectively, the first bellows inhibits the present boot from undergoing deformation in the peripheral direction. Therefore, it is possible to inhibit the present boot from undergoing the undulating deformation. Note that, when the averaged first axial rigidity of the first bellows is higher than the averaged second axial rigidity of the second bellows, it is not preferable because the first bellows exhibits an enlarging repulsive force upon assembling the present boot with a mating major-diameter member. Furthermore, such a first bellows adversely affects the inhibition of undulating deformation.

Moreover, since the minor-diameter-side bellows exhibits the averaged third rigidity, which is made lower than the averaged second rigidity of the second bellows, the minor-diameter-side bellows deforms to extend and/or contract in the axial direction with ease to absorb stress when the inner pressure rises, it is possible to inhibit the present boot from undergoing the undulating deformation. Note that, when the averaged third axial rigidity of the minor-diameter-side bellows is made equal to or higher than the averaged second axial rigidity of the second bellows, the second bellows exhibits a lowering averaged axial rigidity relatively to adversely affect the inhibition of undulating deformation. In addition, the minor-diameter-side bellows exhibits an enlarging repulsive force upon assembling the present boot with a mating minor-diameter member.

Note that it is preferable to arrange the minor-diameter-side bellows in the following manner. That is, the minor-diameter-side bellows has crests, and roots. Further, the crests comprise a front membrane, and a rear membrane. Furthermore, the front membrane is disposed in succession from one of the roots, which is disposed on a side of the minor-diameter fastener. Moreover, the rear membrane is disposed in succession from one of the roots, which is disposed on a side of the major-diameter fastener. In addition, the front membrane exhibits a front-membrane axial rigidity, the rear membrane exhibits a rear-membrane axial rigidity, and the rear-membrane axial rigidity is higher or lower than the front-membrane axial rigidity. In the thus constructed preferable minor-diameter-side bellows, the rear or front membranes, which exhibit a lower axial rigidity, deform to extend and/or contract so as to be eventually pressed into the front or rear membranes, which exhibit a higher axial rigidity. Consequently, the minor-diameter-side bellows can extend and/or contract more easily. Therefore, the minor-diameter-side bellows can furthermore inhibit the present boot from undergoing the undulating deformation. Note that, in the first bellows, too, it is preferable as well to make the rear-membrane axial rigidity higher or lower than the front-membrane axial rigidity.

The minor-diameter-side bellows can preferably be formed as a tapered configuration whose outside diameter tapers from large to small in the direction away from the second bellows to the minor-diameter fastener. In the thus constructed preferable minor-diameter-side bellows, the smaller outside diameter the crests of the minor-diameter-side bellows have toward the leading end thereof, the higher axial rigidity the minor-diameter-side bellows can exhibit. That is, the closer to the minor-diameter fastener, the higher axial rigidity the minor-diameter-side bellows can exhibit. Hence, the minor-diameter-side bellows can furthermore inhibit the present boot from undergoing deformation in the peripheral direction by the configurational effect.

Figure 2:
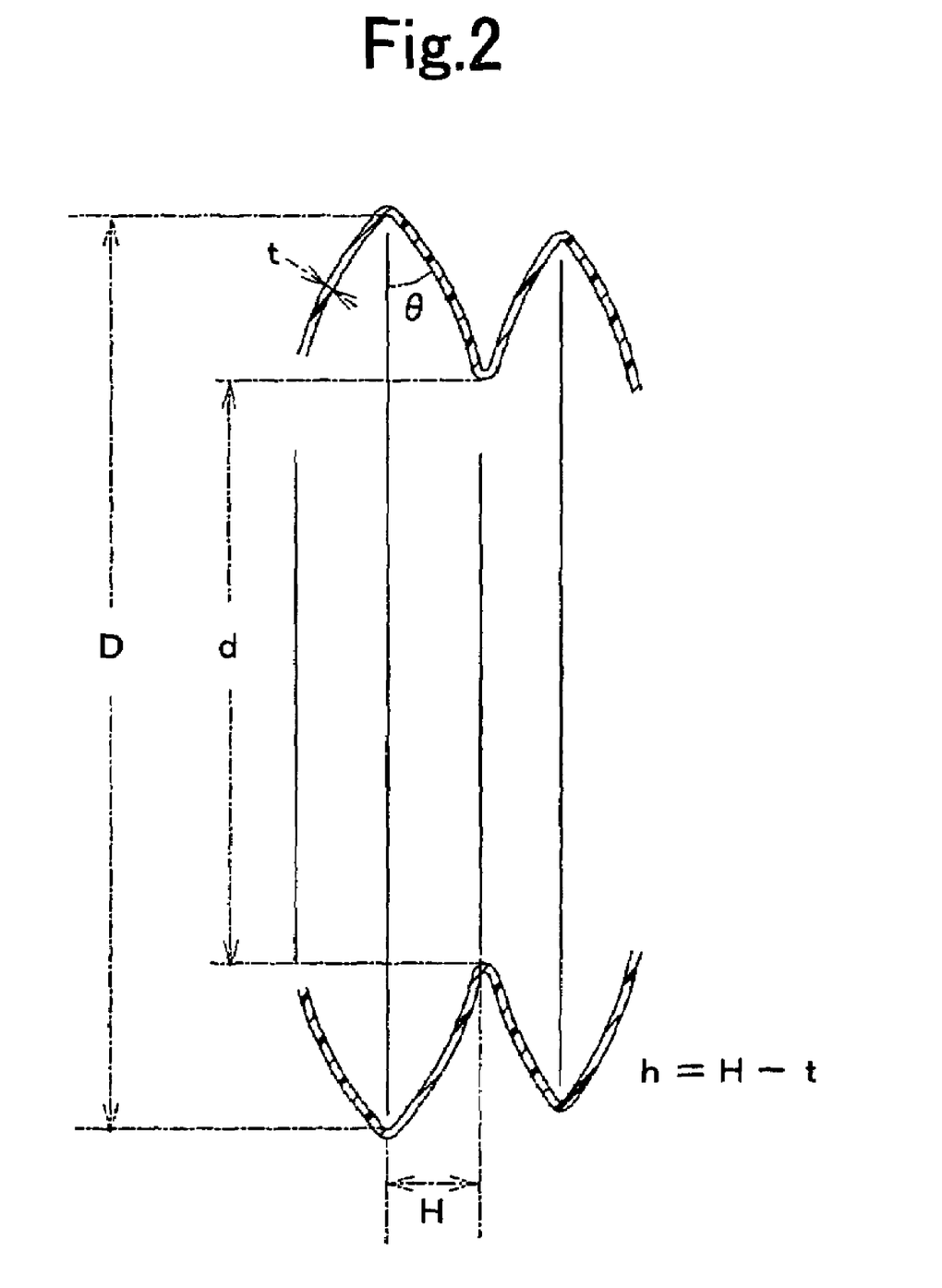
FIG. 2 is an enlarged axial cross-sectional view of the steering boot according to Example No. 1 in which a major section thereof is enlarged.

When cutting out the front membrane or rear membrane only from the minor-diameter-side bellows, the cut-out front or rear membrane is formed as a three-dimensional disk-shaped configuration, which is pierced through, as illustrated in FIG. 2. The outer peripheral ridge line of the crests makes a larger-diameter portion, and the inner peripheral bottom line of the roots makes a smaller-diameter portion (or the central opening). Moreover, an annular resinous film is disposed between the larger-diameter portion and the smaller-diameter portion to connect them in an inclining manner with respect to the diametric direction, or in a tapering manner from large to small in the direction away from the larger-diameter portion to the smaller-diameter portion. Therefore, it is possible to control the magnitude of axial rigidity by designing the inclination angle, which the front membrane or rear membrane makes with respect to the diametric direction of the minor-diameter-side bellows, the pitch between the crests or roots, the diametric difference between the crests and the roots, or the thickness.

Even when one of the crests of the second bellows exhibits an axial rigidity, which is higher than the averaged first axial rigidity of the first bellows and the averaged third axial rigidity of the minor-diameter-side bellows, the second bellows produces the advantages, as such, appreciably. However, it is preferable that the second bellows can have a length, which is shorter than the entire length of bellows, that is, a summed length of the first bellows, the second bellows and the minor-diameter-side bellows, by a factor of from 10 to 30%. Moreover, the second bellows can desirably comprise the crest, whose axial rigidity is higher than the averaged first axial rigidity of the first bellows and the averaged third axial rigidity of the minor-diameter-side bellows, in a quantity of 3 or more. On the other hand, it is preferable that the first bellows or minor-diameter-side bellows, whose averaged first or third axial rigidity is lower than the averaged second axial rigidity of the second bellows, can preferably have a length, which is shorter than the entire length of bellows, that is, a summed length of the first bellows, the second bellows and the minor-diameter-side bellows, by a factor of from 10 to 40%. Moreover, the first bellows or minor-diameter-side bellows can desirably comprise the crest, whose axial rigidity is lower than the averaged second axial rigidity of the second bellows, in a quantity of from 3 to 6.

EXAMPLES

Hereinafter, the present invention will be described more specifically with reference to examples and a comparative example.

Example No. 1

Figure 1:
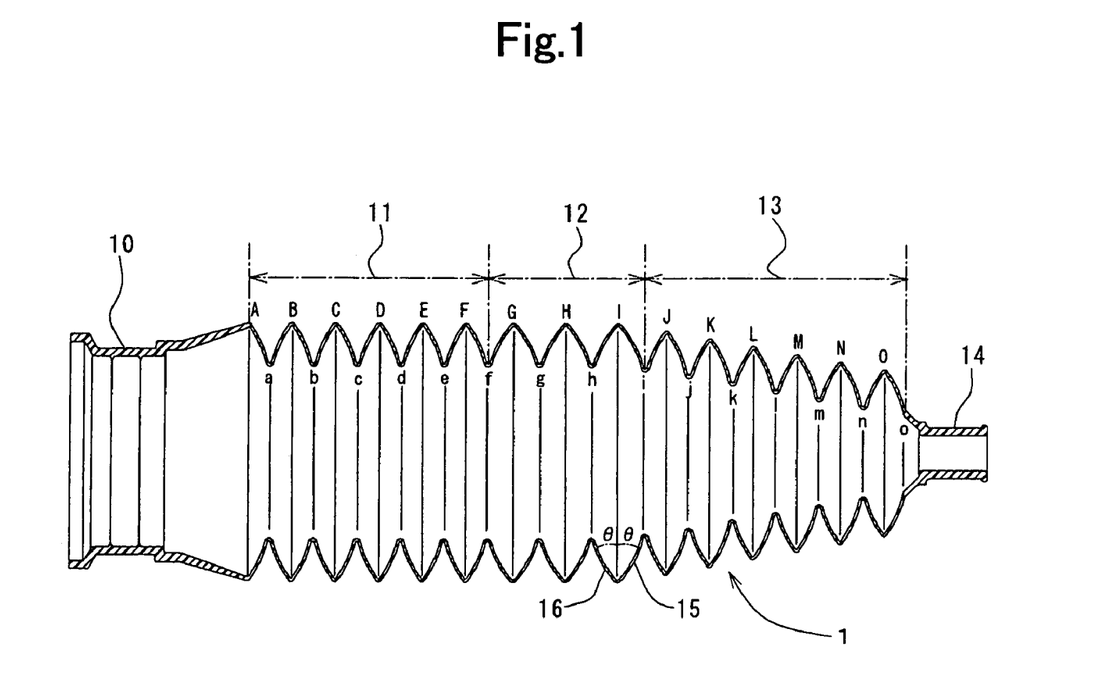
FIG. 1 is an axial cross-sectional view of a steering boot according to Example No. 1 of the present invention.

FIG. 1 illustrates an axial cross-sectional view of a steering boot according to Example No. 1 of the present invention. As illustrated in the drawing, a boot 1 comprises a major-diameter fastener 10, a first bellows 11, a second bellows 12, a minor-diameter-side bellows 13, and a minor-diameter fastener 14. The first bellows 11 is disposed continuously from the major-diameter fastener 10. The second bellows 12 is disposed continuously from the first bellows 11. The minor-diameter-side, bellows 13 is disposed continuously from the second bellows 12. The minor-diameter fastener 14 is disposed continuously from the minor-diameter-side bellows 13. The boot 1 is made from resin, and is manufactured integrally by blow molding. Note that the boot 1 is not subjected to any heat treatment at all.

The major-diameter fastener 10 and minor-diameter fastener 14 are formed as a ring shape, respectively. Around the major-diameter fastener 10, a not-shown clamp is fitted. The clamp tightens the major-diameter fastener 10 to fasten it onto the outer peripheral surface of one of the opposite ends of not-shown steering gear box. Moreover, around the minor-diameter fastener 14, another not-shown clamp is fitted. The other clamp tightens the minor-diameter fastener 14 to fasten it onto the outer peripheral surface of one of the opposite ends of not-shown tie rod.

The first bellows 11 is formed as a cylindrical bellows shape, which is disposed continuously from the major-diameter fastener 10. The first bellows 11 comprises six crests "A" through "F," and six roots "a" through "f." The six crests "A" through "F" have a substantially identical inside diameter to each other. Similarly, the six roots "a" through "f" have a substantially identical inside diameter to each other. The first bellows 11 accommodates a part of not-shown rack therein coaxially therewith.

The second bellows 12 is formed as a cylindrical bellows shape, which is disposed continuously from the first bellows 11. The second bellows 12 comprises three crests "G" through "I," and three roots "g" through "i." The three crests "G" through "I" have a substantially identical inside diameter to each other. Similarly, the three roots "g" through "i" have a substantially identical inside diameter to each other. The second bellows 12 accommodates one of the opposite ends of not-shown rack and a not-shown ball joint therein.

Figure 3:
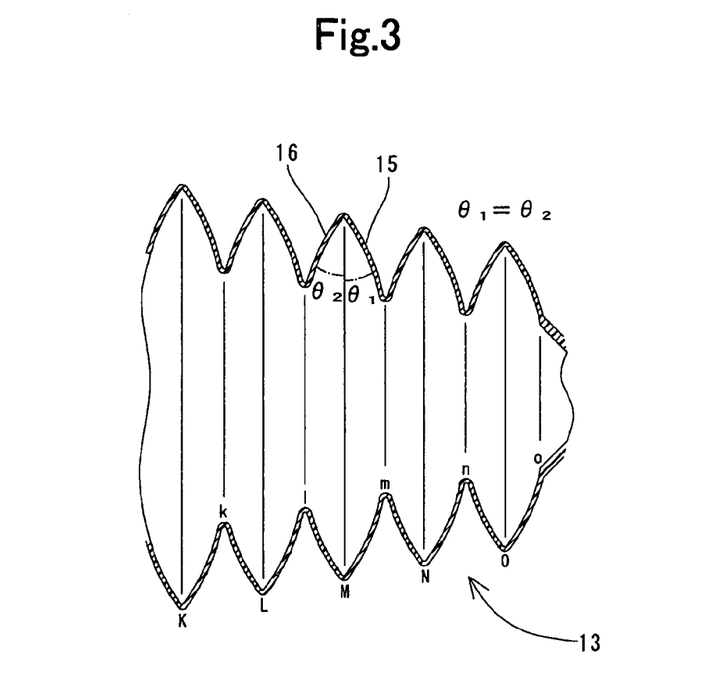
FIG. 3 is another enlarged axial cross-sectional view of the steering boot according to Example No. 1 in which another major section thereof is enlarged.

FIG. 3 illustrates the minor-diameter-side bellows 13 in an enlarged manner. As shown in the drawing, the minor-diameter-side bellows 13 is disposed continuously from the second bellows 12, and is formed as a tapered truncated cone shape. That is, as illustrated in FIG. 1, the minor-diameter-side bellows 13 comprises six crests "J" through "O," and six roots "j" through "o." As best shown in FIG. 3, the six crests "J" through "O" have inside diameters, which taper diametrically from large to small in the direction away from the second bellows 12 to the minor-diameter fastener 14. Similarly, the six roots "j" through "o" have inside diameters, which taper diametrically from large to small in the direction away from the second bellows 12 to the minor-diameter fastener 14. The minor-diameter-side bellows 13 accommodates a part of not-shown tie rod, which is connected with the ball joint, therein in a coaxial manner.

Especially, the boot 1 according to Example No. 1 of the present invention comprises the first bellows 11, which exhibits an averaged first axial rigidity, the second bellows 12, which exhibits an averaged second axial rigidity, and the minor-diameter-side bellows 13, which exhibits an averaged third axial rigidity. Moreover, in the boot 1 according to Example No. 1, the averaged first axial rigidity of the first bellows 11 is designed to be lower than the averaged second axial rigidity of the second bellows 12. In addition, the averaged third axial rigidity of the minor-diameter-side bellows 13 is designed to be lower than the averaged second axial rigidity of the second bellows 12. Specifically, the averaged first axial rigidity is set at 70% with respect to the averaged second axial rigidity taken as 100%. The averaged third axial rigidity is set at 70% with respect to the averaged second axial rigidity taken as 100%.

First, the first bellows 11 comprises the crests "A" through "F," all of which are formed as an identical configuration substantially, and the roots "a" through "f," all of which are formed as an identical configuration substantially. Each of the crests "A" through "F" comprises a front membrane, and a rear membrane. For example, as can be seen from FIG. 1, the front membrane herein designates the section of the first bellows 11 from the top of the crest "D" to the bottom of the root "d." On the other hand, the rear membrane herein designates the section of the first bellows 11 from the bottom of the root "c" to the top of the crest "D," for instance. The front membrane and rear membrane exhibit a virtually identical axial rigidity, respectively. Note that, in the boot 1 according to Example No. 1 of the present invention, the dimensions shown in FIG. 2, the following specific dimensions, are determined while taking the load for assembling boot into consideration: the thickness "t" of the front and rear membranes; the inside diameter "D" of the crests "A" through "F"; the inside diameter "d" of the roots "a" through "f"; the horizontal distance "H" between the crests and roots; and the angle θ, which the front and rear membranes make with respect to the diametric of the first bellows 11.

Figure 6:
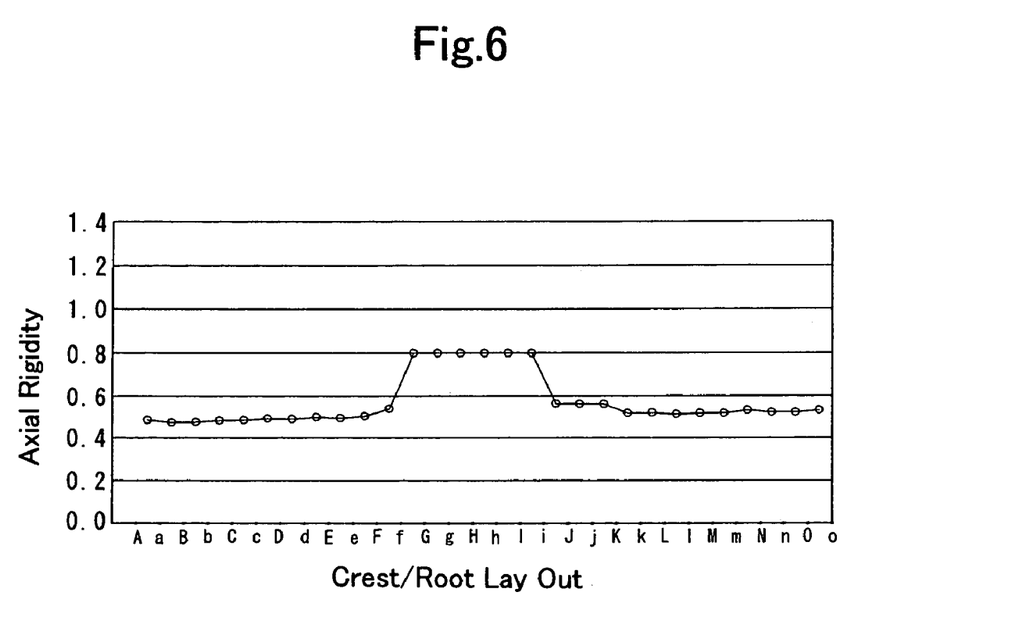
FIG. 6 is a graph for showing the axial rigidity of respective front membranes and rear membranes, the constituent parts of the steering boot according to Example No. 1.

Second, the second bellows 12 comprises the crests "G" through "I," all of which are formed as an identical configuration substantially, and the roots "g" through "i," all of which are formed as an identical configuration substantially. However, the second bellows 12 comprises front membranes, which make a larger angle θ with respect to the diametric direction of the second bellows 12 than the angle θ, which the front membranes of the first bellows 11 make with respect to the diametric direction of the first bellows 11. On the other hand, the second bellows 12 has the same thickness "t," the same inside diameter "D," and the same inside diameter "d," as those of the first bellows 11. Accordingly, the second bellows 12 has a larger dimension "h" shown in FIG. 2, the difference between the horizontal distance "H" and the membrane thickness "t" (i.e., "h"="H"−"t"), than that of the first bellows 11. In other words, each of the crests "G" through "I" comprises a front membrane which exhibits a higher axial rigidity than the axial rigidity exhibited by the front membrane of each of the crests "A" through "F" of the first bellows 11, and a rear membrane which exhibits a higher axial rigidity than the axial rigidity exhibited by the rear membrane of each of the crests "A" through "F" of the first bellows 11. For example, as illustrated in FIG. 1, the crest "I" comprises a front membrane 15, which starts at the top of the crest "I" and finishes at the bottom of the root "i," and a rear membranes 16, which start at the bottom of the root "h" and finishes at the top of the crest "I." The front membranes 15 of the second bellows 12 exhibit an axial rigidity, which is higher than the axial rigidity of the front membranes 15 of the first bellows 11; and the rear membranes 16 of the second bellows 12 exhibit an axial rigidity, which is higher than the axial rigidity of the rear membranes 16 of the first bellows 11. Consequently, as illustrated in FIG. 6, the second bellows 12 exhibits an averaged second axial rigidity, which is higher than a first averaged axial rigidity exhibited by the first bellows 11.

Third, as illustrated in FIG. 1, except that the minor-diameter-side bellows 13 has the reducing outside diameter, which tapers diametrically from large to small in the direction away from the second bellows 12 to the minor-diameter fastener 14, the minor-diameter-side bellows 13 comprises the crests "J" through "O," all of which are formed as an identical configuration substantially as a whole, but the diametric size, and the roots "j" through "o," all of which are formed as an identical configuration substantially as a whole, but the diametric size. Specifically, as illustrated in FIG. 3, the minor-diameter-side bellows 13 comprises front membranes 15, which make an angle $\theta_1$ with respect to the diametric direction of the minor-diameter-side bellows 13, and rear membranes 16, which make an angle $\theta_2$ with respect to the diametric direction of the minor-diameter-side bellows 13. For example, one of the front membranes 15 is the section, which starts at the top of the crest "M" and finishes at the bottom of the root "m," and one of the rear membranes 16 is the section, which starts at the bottom of the root "l" and finishes at the top of the crest "M." Note that, in the minor-diameter-side bellows 13, the angle $\theta_1$ is equal to the angle $\theta_2$ virtually; but the angle $\theta_1$ and angle $\theta_2$ are smaller than the angle θ, which the front membranes 15 and rear membranes 16 of the second bellows 12 make with respect to the diametric direction of the second bellows 12; and the angle $\theta_1$ and angle $\theta_2$ are smaller than the angle θ, which the front membranes 15 and rear membranes 16 of the first bellows 11 make with respect to the diametric direction of the first bellows 11.

Therefore, the dimension "h" of the minor-diameter-side bellows 13's front membranes 15 and rear membranes 16 is smaller than the dimension "h" of the second bellows 12's front membranes 15 and rear membranes 16, and is slightly smaller than the dimension "h" of the first bellows 11's front membranes 15 and rear membranes 16. In other words, as illustrated in FIG. 6, the minor-diameter-side bellows 13's front membranes 15 and rear membranes 16 exhibit a lower axial rigidity than the second bellows 12's front membranes 15 and rear membranes 16 do on average. On the other hand, the averaged axial rigidity of the minor-diameter-side bellows 13's front membranes 15 and rear membranes 16 is equal to that of the first bellows 11's front membranes 15 and rear membranes 16 virtually.

All in all, in the boot 1 according to Example No. 1 of the present invention, the second bellows 12 is designed to exhibit a higher averaged axial rigidity than the averaged axial rigidity of the first bellows 11 and the averaged axial rigidity of the minor-diameter-side bellows 13. The second bellows 12, which exhibits a higher averaged axial rigidity, inhibits the boot 1 according to Example No. 1 from deforming in the peripheral direction. The first bellows 11 and minor-diameter-side bellows 13, which exhibit a lower averaged axial rigidity, expand and/or contract to absorb the stress. As a result, it is possible to securely inhibit the boot 1 according to Example No. 1 from undergoing the undulating deformation.

Example No. 2

Except that the minor-diameter-side bellows 13 is structured differently, a boot 1 according to Example No. 2 of the present invention is configured in the same manner as the boot 1 according to Example No. 1.

Figure 4:
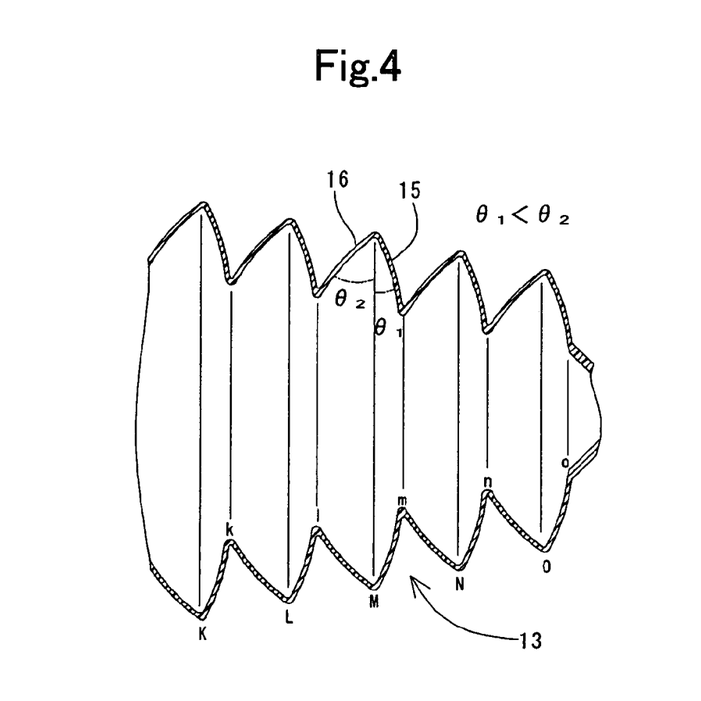
FIG. 4 is an enlarged axial cross-sectional view of a steering boot according to Example No. 2 of the present invention in which a major section thereof is enlarged.
Figure 7:
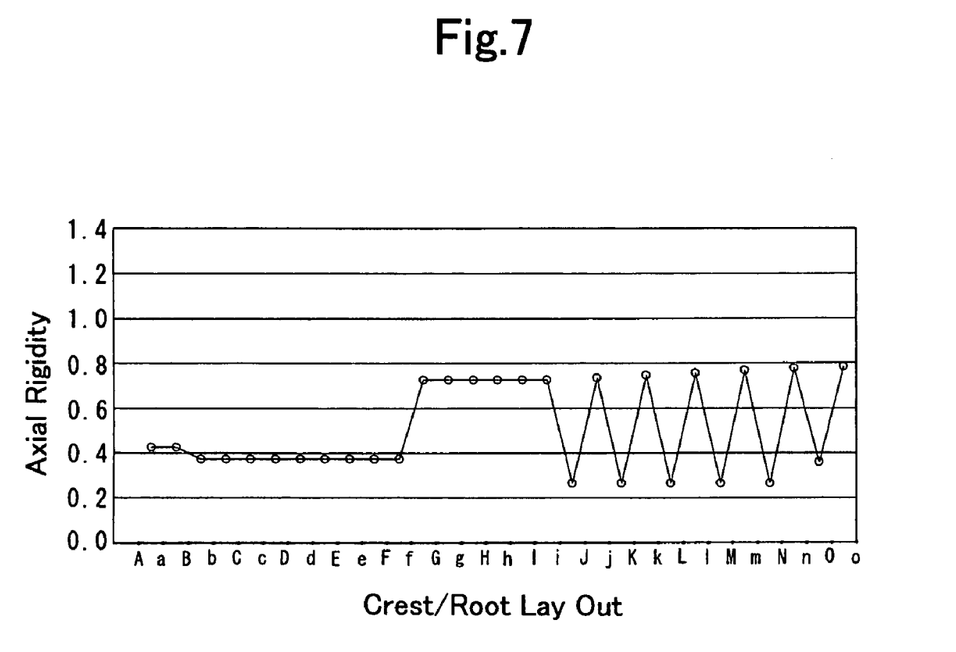
FIG. 7 is a graph for showing the axial rigidity of respective front membranes and rear membranes, the constituent parts of the steering boot according to Example No. 2.

A boot 1 according to Example No. 2 of the present invention comprises a minor-diameter-side bellows 13 as illustrated in FIG. 4. As shown in the drawing, the minor-side-diameter bellows 13 comprises front membranes 15, and rear membranes 16 in the same manner as that of the boot 1 according to Example No. 1. Similarly, one of the front membranes 15, the section which starts at the top of the crest "M" and finishes at the bottom of the root "m," for instance, makes an angle $\theta_1$ with respect to the diametric direction of the minor-diameter-side bellows 13, and one of the rear membranes 16, the section which starts at the bottom of the root "l" and finishes at the top of the crest "M," makes an angle $\theta_2$ with respect to the diametric direction of the minor-diameter-side bellows 13. However, in the minor-diameter-side bellows 13 of the boot 1 according to Example No. 2, the angle $\theta_2$ is designed to be larger than the angle $\theta_1$, i.e., $\theta_2 > \theta_1$. Moreover, the angle $\theta_2$ is larger than the angle θ, which the front membranes 15 and rear membranes 16 of the second bellows 12 make with respect to the diametric direction of the second bellows 12, i.e., $\theta_2 > \theta$. On the other hand, the angle $\theta_1$, which the front membranes 15 of the minor-diameter-side bellows 13 makes with respect to the diametric direction of the minor-diameter-side bellows 13, is equal to the angle $\theta_1$ and angle $\theta_2$, which the front membranes 15 and rear membranes 16 of the first bellows 11 make with respect to the diametric direction of the first bellows 11. Accordingly, in the minor-diameter-side bellows 13 of the boot 1 according to Example No. 2, the dimension "h" of the front membranes 15 is smaller than the dimension "h" of the rear membranes 16. Consequently, as illustrated in FIG. 7, the minor-diameter-side bellows 13's front membranes 15 and rear membranes 16 exhibit a lower axial rigidity than the second bellows 12's front membranes 15 and rear membranes 16 do on average.

Thus, the boot 1 according to Example No. 2 of the present invention is designed to comprise the second bellows 12 whose averaged axial rigidity is higher than the averaged axial rigidity of the first bellows 11 and the averaged axial rigidity of the minor-diameter-side bellows 13. Accordingly, the second bellows 12, which exhibits a higher averaged axial rigidity, inhibits the boot 1 from deforming in the peripheral direction. Moreover, the first bellows 11 and minor-diameter-side bellows 13, which exhibit a lower averaged axial rigidity, expand and/or contract to absorb the stress. Consequently, the second bellows 12 as well as the first bellows 11 and minor-diameter-side bellows 13 can securely inhibit the boot 1 from undergoing the undulating deformation.

Moreover, the minor-diameter-side bellows 13 of the boot 1 according to Example No. 2 of the present invention is formed as a tapered configuration whose outside diameter reduces from large to small as a whole as it approaches the minor-diameter fastener 14. Accordingly, the closer the minor-diameter-side bellows 13 approaches the minor-diameter fastener 14 the higher axial rigidity the minor-diameter-side bellows 13 exhibits. Consequently, the minor-diameter-side bellows 13 is effective in inhibiting the boot 1 from undergoing the undulating deformation, even though it might not be preferable from the viewpoint of absorbing the stress, which arises in the second bellows 12. However, the minor-diameter-side bellows 13's rear membranes 16 exhibit a lower axial rigidity than the minor-diameter-side bellows 13's front membranes 15 exhibit, respectively. That is, the minor-diameter-side bellows 13 can deform so as to press the front membranes 15 toward the rear membranes 16 while expanding and/or contracting. Therefore, the thus deforming minor-diameter-side bellows 13 can absorb the stress so that it is possible to inhibit the boot 1 from undergoing the undulating deformation.

Comparative Example

Figure 5:
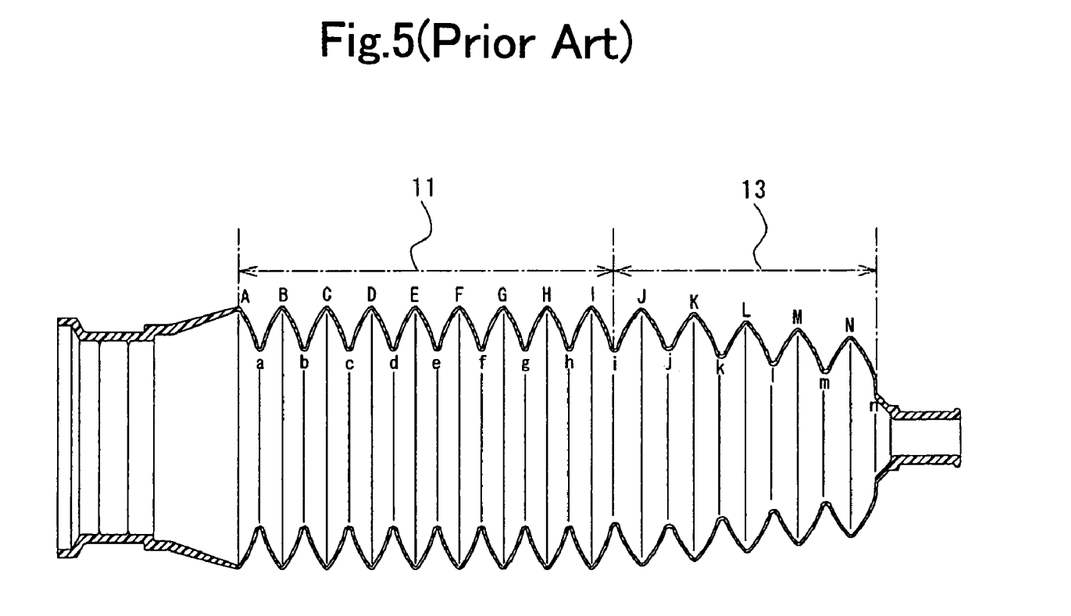
FIG. 5 is an axial cross-sectional view of a steering boot according to a comparative example.

FIG. 5 illustrates an axial cross-sectional view of a boot according to Comparative Example. As shown in the drawing, the comparative boot is free of the second bellows 12 as described in Example Nos. 1 and 2. Instead of the second bellows 12, the comparative boot comprises an extended first bellows 11. The extended first bellows 11 is formed as the same configuration as that of the first bellows 11 of the boot 1 according to Example No. 1, but is formed extendedly up to the location where the second bellows 12 is disposed in the boot 1 according to Example No. 1. In the comparative boot, the minor-diameter-side bellows 13 is formed as the same configuration as that of the minor-diameter-side bellows 13 of the boot 1 according to Example No. 1. Specifically, the minor-diameter-side bellows 13 of the comparative boot comprises front membranes 15, which make an angle $\theta_1$ with respect to the diametric direction of the minor-diameter-side bellows 13, and rear membranes 16, which make an angle $\theta_2$ with respect to the diametric direction of the minor-diameter-side bellows 13. Moreover, the angle $\theta_1$ is equal to the angle $\theta_2$ virtually. However, the minor-diameter-side bellows 13 of the comparative boot differs from that of the boot 1 according to Example No. 1 in that the inclination angles $\theta_1$ and $\theta_2$ are larger than those which the front membranes 15 and rear membranes 16 of the minor-diameter-side bellows 13 of the boot 1 according to Example No. 1 make.

Figure 8:
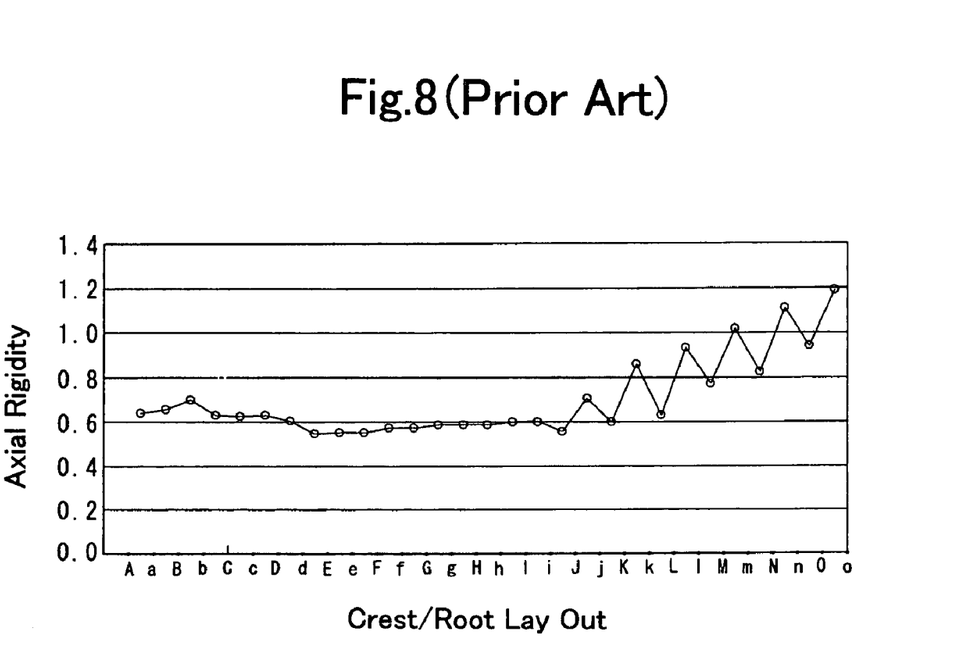
FIG. 8 is a graph for showing the axial rigidity of respective front membranes and rear membranes, the constituent parts of the steering boot according to the comparative example.

Therefore, as illustrated in FIG. 8, the front membranes 15 and rear membranes 16 of the minor-diameter-side bellows 13 of the comparative boot exhibit a higher averaged third axial rigidity than the averaged third axial rigidity, which the front membranes 15 and rear membranes 16 of the minor-diameter-side bellows 13 of the boot according to Example No. 1 exhibit.

Test and Evaluation

The boots 1 according to Example Nos. 1 and 2 of the present invention, and the boot according to Comparative Example were fastened between a steering gear box and a tie rod, respectively. The present boots 1 and comparative boot were heated at 80° C. for 1 hour, and were thereafter cooled at room temperature for 2 hours or more. After cooling, the present boots 1 and comparative boot were subjected to a test for examining the diametric deformation magnitude. The present boots 1 and comparative boot were evaluated by the maximum value of diametric deformation magnitudes. Table 1 below summarizes the evaluation results.

TABLE 1

|  | Ex. No. 1 | Ex. No. 2 | Comp. Ex. |
|---|---|---|---|
| Max. Diametric Deformation Magnitude (mm) | 1.7 | 0.9 | 5.1 |

As set forth in Table 1, the boots 1 according to Example Nos. 1 and 2 of the present invention exhibited a maximum diametric deformation magnitude of 3 mm or less. Thus, it is apparent that the present boots 1 were remarkably less likely to suffer from the undulating deformation than the comparative boot was.

Moreover, the boot 1 according to Example No. 2 of the present invention exhibited a smaller maximum diametric deformation magnitude than the boot 1 according to Example No. 1 did. Specifically, the maximum diametric deformation magnitude of the boot 1 according to Example No. 2 was reduced by about ½ to that of the boot 1 according to Example No. 1. This advantage is believed to result from the arrangement that the inclination angle $\theta_1$, which the minor-diameter-side bellows 13's front membranes 15 make with respect to the diametric direction of the minor-diameter-side bellows 13, is made different from the inclination angle $\theta_2$, which the minor-diameter-side bellows 13's rear membranes 16 make with respect thereto. That is, when the inner pressure of the boot 1 according to Example No. 2 increases, the front membranes 15, whose axial rigidity is higher, are pressed toward the rear membranes 16, whose axial rigidity is lower, so that the minor-diameter-side bellows 13 is more likely to expand and/or contract in the axial direction. As a result, it is believed that the minor-diameter-side bellows 13 can furthermore absorb the stress.

INDUSTRIAL APPLICABILITY

The present boot can be applied not only to steering boots but also to the other boots such as boots for constant-velocity universal joint.

Having now fully described the present invention, it will be apparent to one of ordinary skill in the art that many changes and modifications can be made thereto without departing from the spirit or scope of the present invention as set forth herein including the appended claims.

What is claimed is:

1. A steering rack boot, comprising:
   a major-diameter fastener to be fastened to a mating major-diameter member;
   a first bellows disposed continuously from the major-diameter fastener, the first bellows exhibiting an averaged first axial rigidity;

a second bellows disposed continuously from the first bellows; the second bellows exhibiting an averaged second axial rigidity higher than the averaged first axial rigidity; and the second bellows having at least three crests and corresponding roots, a membrane thickness, and a horizontal distance extending from a top of the crest to a bottom of the root of the second bellows; and a difference between the horizontal distance and the membrane thickness of the second bellows being larger than a difference between a corresponding horizontal distance and a membrane thickness of the first bellows and the minor-diameter-side bellows; and a minor-diameter-side bellows disposed continuously from the second bellows, and to be fastened to a mating minor-diameter member, the minor-diameter-side bellows exhibiting an averaged third axial rigidity lower than the averaged second axial rigidity.

2. The steering rack boot set forth in claim 1, wherein:

the minor-diameter-side bellows has crests and roots, the crests of the minor-diameter-side bellows comprise:

a front membrane disposed in succession from one of the roots of the minor-diameter-side bellows, which is disposed on a side of the minor-diameter fastener; and a rear membrane disposed in succession from one of the roots of the minor-diameter-side bellows, which is disposed on a side of the major-diameter fastener;

the front membrane exhibits a front-membrane axial rigidity; and the rear membrane exhibits a rear-membrane axial rigidity; and the rear-membrane axial rigidity is higher or lower than the front-membrane axial rigidity.

3. The steering rack boot set forth in claim 1, wherein the minor-diameter-side bellows is formed as a tapered configuration whose outside diameter tapers from large to small in the direction away from the second bellows to the minor-diameter fastener.

4. The steering rack boot set forth in claim 1, wherein the second bellows has a length, which is shorter than a summed length of the first bellows, the second bellows and the minor-diameter-side bellows by a factor of from 10 to 30%.

5. The steering rack boot set forth in claim 1, wherein the first bellows or the minor-diameter-side bellows has a length, which is shorter than a summed length of the first bellows, the second bellows and the minor-diameter-side bellows by a factor of from 10 to 40%.

6. The steering rack boot set forth in claim 1, wherein inside diameters of the crests of the second bellows are identical substantially.

7. The steering rack boot set forth in claim 1, wherein inside diameters of the roots of the second bellows are identical substantially.

* * * * *